No. 829,609. PATENTED AUG. 28, 1906.
F. W. STEINKE.
FLEXIBLE PIPE SYSTEM.
APPLICATION FILED SEPT. 23, 1905.
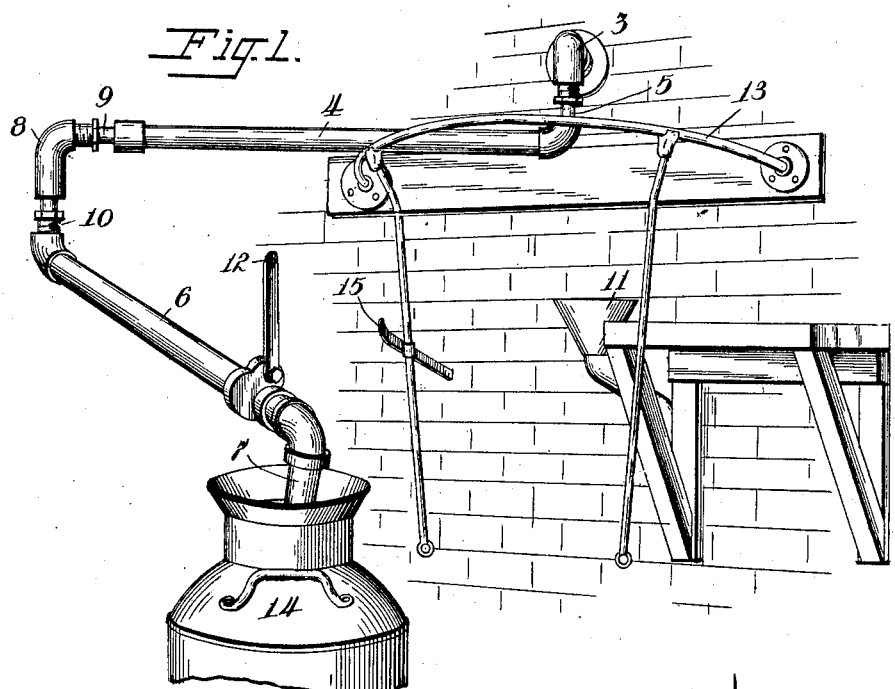
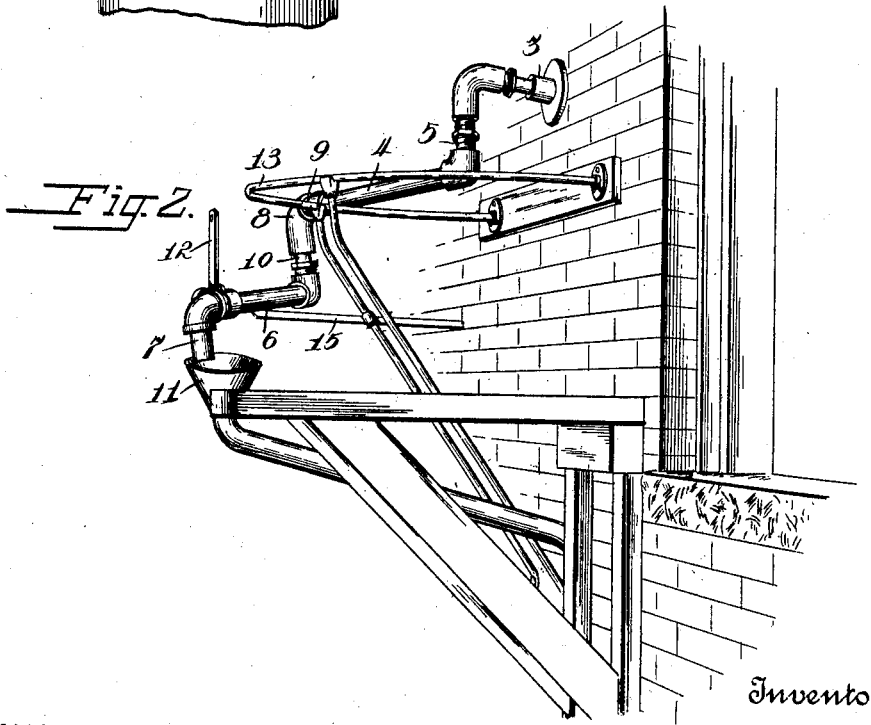
Witnesses
Milton Lenoir
N. S. Waller.
Inventor
Frederick W. Steinke.
by W. X. Stevens.
Attorneys

UNITED STATES PATENT OFFICE.

FREDERICK W. STEINKE, OF OWATONNA, MINNESOTA.

FLEXIBLE-PIPE SYSTEM.

No. 829,609.  Specification of Letters Patent.  Patented Aug. 28, 1906.

Application filed September 23, 1905. Serial No. 279,783.

*To all whom it may concern:*

Be it known that I, FREDERICK W. STEINKE, a citizen of the United States, residing at Owatonna, in the county of Steele and State of Minnesota, have invented certain new and useful Improvements in Flexible-Pipe Systems, of which the following is a specification.

This invention relates to that class of piping systems which are used for delivering skim-milk from creameries into cans located on wagons beside the creamery; and its object is to provide means for supporting flexible jointed metallic pipes, so as to relieve the joints from the strain of the weight of the pipe, and means to retain the delivery-nozzle in a position where its drippings, when not in service, will be conducted to a sewer.

To this end my invention consists in the construction and combination of parts forming a flexible-pipe system hereinafter more fully described, and particularly set forth in the claim, reference being had to the accompanying drawings, in which—

Figure 1 is a perspective view of a flexible jointed pipe and a portion of a milk-can, showing the supporting device, which is the main feature of this invention, in position for service. Fig. 2 is a perspective view of the same device holding the nozzle of the pipe when not in service.

These illustrations represent the flexible jointed metallic pipe which is the subject of my application, Serial No. 256,157, for a patent which is allowed and to be issued October 3, 1905.

The pipe 3, projecting from the side of a creamery-building, is the main delivering-pipe, with which a radial pipe 4 is connected by a vertical pipe 5, which is free to rotate as a pivot, swinging the pipe 4 in a horizontal plane.

6 is the delivery-arm of the pipe, having a nozzle 7 and connected with the radial pipe 4 by an L-coupling 8, which has a rotary joint at 9, around which the pipe 6 may swing vertically to raise and lower the nozzle 7, and a rotary joint at 10, around which the pipe 6 may swing in a plane approximately horizontal. By means of the rotary joints 5 and 10 the two pipes 4 and 6 may be swung about, so as to bring the nozzle 7 over any point in quite a large field, thus enabling it to deliver into each can of a wagonful standing under it and also to be located over a drain-pipe 11 when not in service.

12 is the handle of a valve whereby the flow of milk may be started and stopped.

In practice I have found that when the delivery-pipes are located far at either side of the main pipe 3 their weight tends to rotate the connections on pipes 3 and 4, thus displacing the nozzle and rendering it unreliable unless it is constantly held by an attendant while in service, also tending to make the joint at 3 leak. To overcome this, I provide a rail 13, bent to the arc of a circle and rigidly fixed concentric with the pivotal pipe 5 and in a horizontal plane, which is the path of the lower side of the radial pipe 4, so that the latter in swinging on the said pivot slides upon and is supported by the said rail 13 in all positions of service. When in service, the nozzle 7 enters the mouth of a can 14, and the pipe 6 is supported on the edge thereof; otherwise the tendency of pipe 6 and its nozzle 7 is to hang down from the pivotal bearing 9, and if so left it would deliver the drainings on the ground. This would soon become sour and vitiate the air, and it would also attract flies, both of which objections would be very detrimental to the products of a creamery. I therefore locate a drain-pipe 11 within the field of the nozzle 7 and a retaining-hook 15, on which the pipe 6 may rest and be steadily held when the nozzle 7 is over the drain-pipe. The radial member 4 of this piping system is pivoted at 5 to swing in a horizontal plane. The delivery member 6 is hung for horizontal and vertical movement, and the support not only holds its nozzle over the drain-pipe, but it keeps the free end from hanging in the way of coming and going wagons.

Having thus fully described my invention, what I believe to be new, and desire to secure by Letters Patent, is the following:

In piping systems, a flexible jointed metallic pipe having one of its members pivoted to a fixture to swing in a horizontal plane; a curved rail fixed in the said plane beneath the said member; a delivery-pipe pivotally connected with the aforesaid member; a drip-pipe located in the field of the delivery-pipe, and a fixed support for the delivery-pipe, substantially as described whereby the nozzle of the delivery-pipe may be moved in any direction horizontally and vertically to bring it into position for service, and whereby the said nozzle, when not in service, may be held in position for its drippings to be caught by the said drip-pipe.

In testimony whereof I affix my signature in presence of two witnesses.

FREDERICK W. STEINKE.

Witnesses:
    J. W. ROWLAND,
    WM. J. TOHER.